United States Patent

[11] 3,612,185

| [72] | Inventors | Darrel Grauberger;<br>Roy Grauberger, both of R.R. #2, Fleming, Colo. 80728 |
|---|---|---|
| [21] | Appl. No. | 809,630 |
| [22] | Filed | Mar. 24, 1969 |
| [45] | Patented | Oct. 12, 1971 |

[54] IMPLEMENT SYSTEMS
10 Claims, 7 Drawing Figs.

[52] U.S. Cl............................................. 172/314, 172/327, 111/85, 280/411
[51] Int. Cl.............................................. A01c 5/00, A01b 49/00
[50] Field of Search............................................. 172/313, 314, 310, 327–328, 680, 396, 316, 502; 111/52, 69, 85; 280/411.1, 412, 413, 478–480, 490

[56] References Cited
UNITED STATES PATENTS

| 3,469,636 | 9/1969 | Kurz | 172/314 |
| 636,371 | 11/1899 | Whipple | 172/326 |
| 1,166,207 | 12/1915 | Hildebrandt | 172/326 |
| 1,375,577 | 4/1921 | Dunlap | 172/327 |
| 1,708,922 | 4/1929 | Loots et al. | 280/411.2 X |
| 1,784,193 | 12/1930 | McOsker | 172/327 |
| 1,876,723 | 9/1932 | Minton | 280/411.3 |
| 2,081,083 | 5/1937 | Beebe | 280/411.3 |
| 2,142,016 | 12/1938 | Branch | 280/411.3 |
| 2,955,848 | 10/1960 | Hyland et al. | 280/411.3 |
| 3,115,853 | 12/1963 | Gellner | 111/85 X |
| 3,239,014 | 3/1966 | Oerman et al. | 172/314 X |

FOREIGN PATENTS

| 1,063,124 | 12/1953 | France | 280/490 |
| 576,353 | 5/1933 | Germany | 172/313 |

*Primary Examiner*—Robert E. Pulfrey
*Assistant Examiner*—Stephen C. Pellegrino
*Attorney*—Hugh H. Drake ABSTRACT: An agricultural implement system includes at least two towed units with each having a frame carried between a pair of wheels. As illustrated, the frame supports a seed drill. Each of the units has a castor wheel assemblage rigidly but adjustably fixed from and ahead of its frame. A V-shaped drawbar is secured to each frame so as to swing vertically and is suspended in an adjustably fixed horizontal position from the respective castor wheel assemblage.

The two units may be towed in common behind a tractor by means of a hitch system that locates one unit behind the other with a relative overlapping of wheels so that the operative end of one drill is aligned behind the opposite end of the other. The system includes a strut projecting laterally from the forward unit onto the outer end of which the drawbar of the rear unit is coupled. An element coupled to the tractor is in turn interconnected to the two units by links and linkages that resemble spokes fanned outwardly from that element. The strut is arranged to swing vertically, while loose-fitting vertically oriented pins serve to interconnect at least most of the different links, linkages and the strut so as to permit flexibility and quick and easy assembly and disassembly of the system. The different coupling elements also are structured to permit the units, instead, to be towed in cascade.

Inventors
Darrel Grauberger
Roy Grauberger
Attorney

PATENTED OCT 12 1971 3,612,185
SHEET 2 OF 3
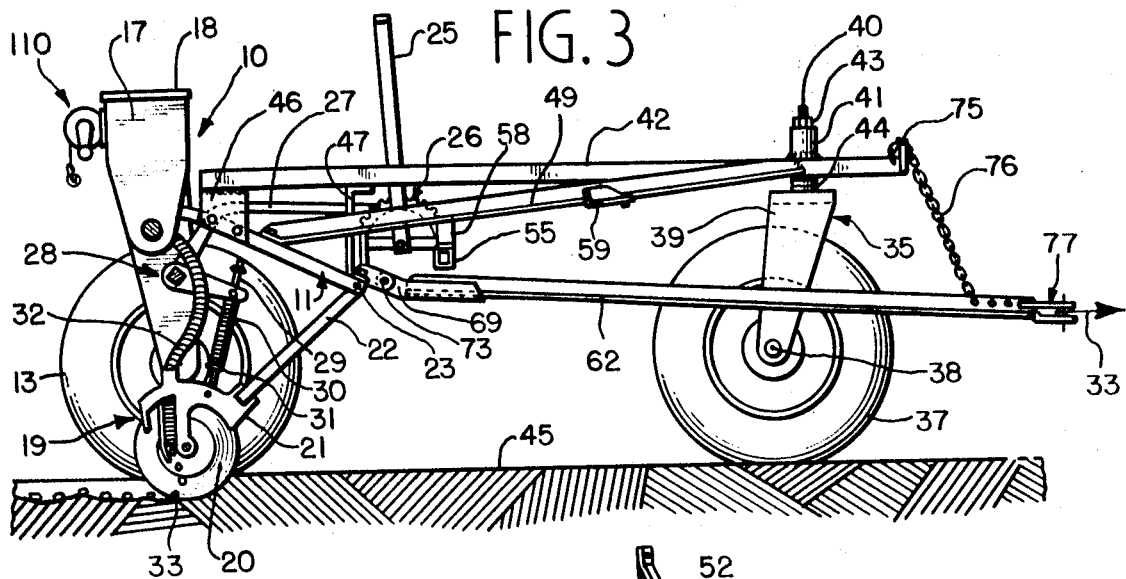
FIG. 3
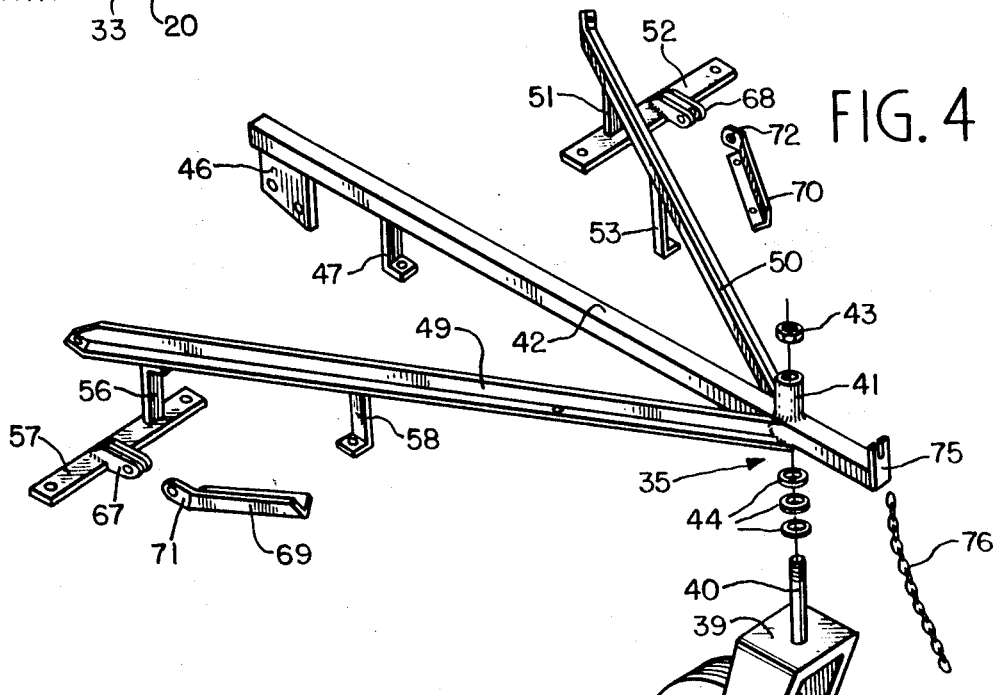
FIG. 4
FIG. 5
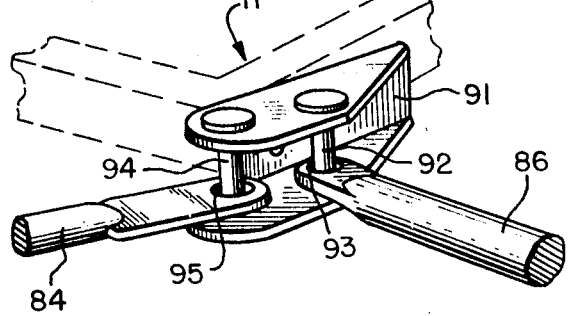
Inventors
Darrel Grauberger
Roy Grauberger
By [signature]
Attorney

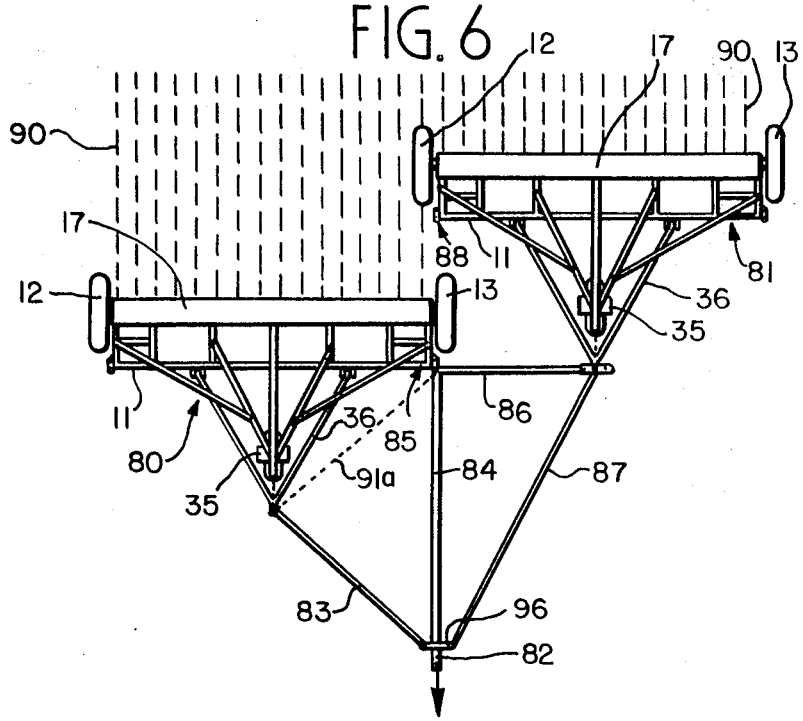
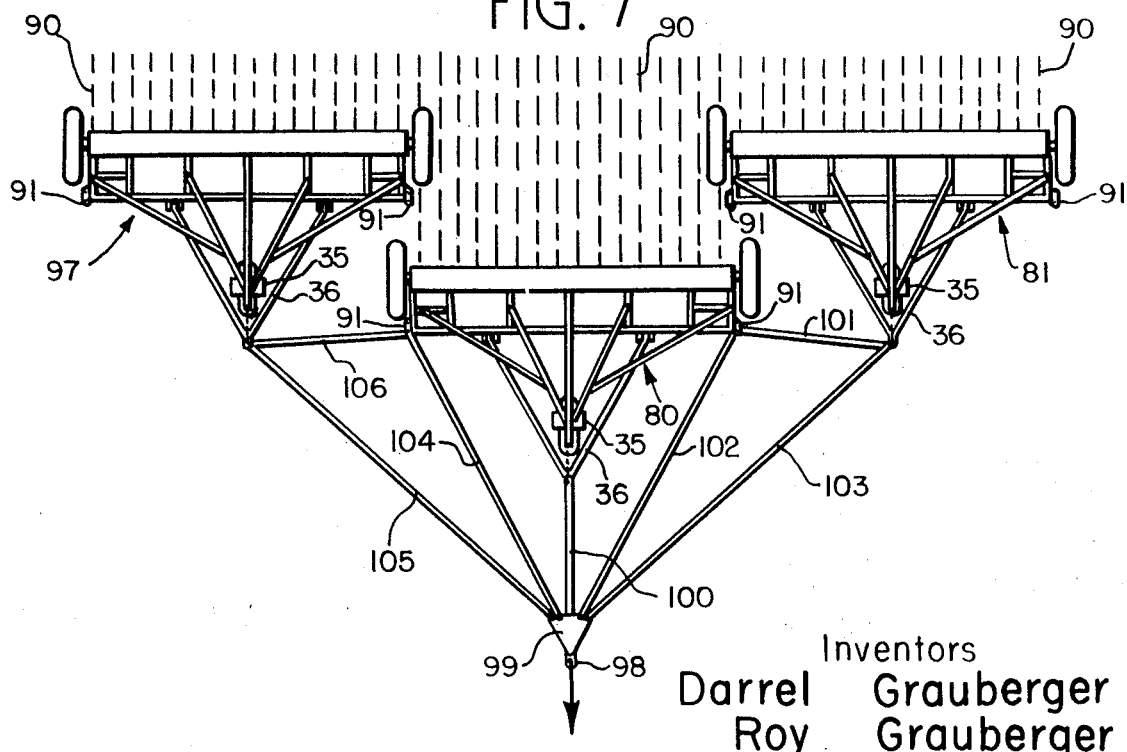

IMPLEMENT SYSTEMS

The present invention pertains to implement systems. More particularly, it relates to hitches for towing a plurality of agricultural implements by means of a common source of motive power.

Because of the necessity of using public and private roadways of usually limited width in order to move agriculture implements from one field to another or between the fields and a central area for maintenance, repair or storage, many, if not most, agriculture implements as manufactured have a width that is limited so as to be compatible with travel over such roadways. At the same time, however, it often is desirable when actually using such implements in the field to span a much wider width as the machinery moves along. To this end, various schemes have been advanced for interconnecting a plurality of towed implements at least generally in side-to-side relationship while being pulled by a single tractor. Subsequently, the units are disconnected from one another so as to be movable down a roadway either individually or by being reconnected in a different cascade arrangement such that one is pulled directly behind the next.

Of course, the concept of combing a plurality of implements so as to sweep a wider path while using but a single tractor is valuable in the saving of time and the conservation of manpower and equipment. A single driver using but a single tractor can cover a much greater area in a given period of time and for a given cost of manpower and motive equipment. However, different ones of the arrangements previously suggested to permit such implement combination have suffered from various shortcomings and deficiencies. In at least some cases, the plural hitching assemblies have required substantial time and effort in order to accomplish their connection and disconnection. In others, the connection or disconnection procedure has involved the lifting of heavy weight which required either additional manpower or the somewhat unwieldy and time-consuming use of a jack or the like. A still further difficulty with at least certain of these prior approaches has been the existence of physical interference between one implement unit and the next during a turning movement of the entire combination. Still another difficulty with some combination arrangements has resulted from insufficient attitude flexibility to accommodate unevenness of the ground surface over which units are towed.

It is a general object of the present invention to provide an agricultural implement plural hitch arrangement in which the aforenoted deficiencies and difficulties are overcome.

Another object of the present invention is to provide a hitch arrangement which is simple and easy to assemble and disassemble and yet which is inexpensive to manufacture.

A further object of the present invention is to provide a new and improved hitch assembly that permits even distribution of an agricultural process across a wide span of parallel furrows or the like.

Still another object of the present invention is to provide a hitch arrangement in which stresses developed in the different components are minimized.

An implement system in accordance with the present invention includes at least two towed units each of which has a frame disposed axially horizontal between a pair of wheels and which carries an agricultural assemblage. A plural hitch includes an element for horizontally pivotal attachment to a source of towing power. Coupled between that element and a portion of one of the frames intermediate its wheels is a first linkage, while a first link is coupled between the element and one end portion of that frame. Vertically pivoting above and below a horizontal plane and laterally projecting away from that end portion a selected distance is a rigid strut. A second link is coupled between the element and the outboard strut end. Finally, a second linkage has its one end coupled to that outboard strut end and has its other end pivotally coupled vertically to a portion of the other of the frames intermediate its wheels. The aforementioned second linkage is of a length to dispose the other frame to the rear of the one frame and the strut distance is of a length to dispose the end of one of the agricultural assemblies substantially in alignment with and ahead of the opposite end of the other of those assemblies. Included as a further feature of the invention is a castor wheel assemblage for each unit; each is rigidly affixed from and ahead of its frame. Other features include a vertically pivotal coupling between each linkage and its respective frame, detachable vertical-pin-type couplings between different ones of the struts and linkages and a separate caster wheel assembly.

The features of the present invention which are believed to be novel are set forth with particularity in the appended claims.

The organization and manner of operation of the invention, together with further objects and advantages thereof, may best be understood by reference to the following description taken in conjunction with the accompanying drawings in the several figures of which like reference numerals identify like elements and in which:

FIG. 3 is a side elevational view, partially broken away, of the implement shown in FIG. 1;

FIG. 4 is an exploded perspective view of a portion of the implement depicted in FIGS. 1 and 3;

FIG. 5 is a fragmentary perspective view of a portion of the implement of FIG. 1 as incorporated into the systems depicted in FIGS. 6 and 7;

FIG. 6 is a plan view of a plural hitch arrangement including a pair of implements like that shown in FIG. 1; and FIG. 7 is a plan view of a plural hitch arrangement including three implements like that depicted in FIG. 1.

Figure 1:
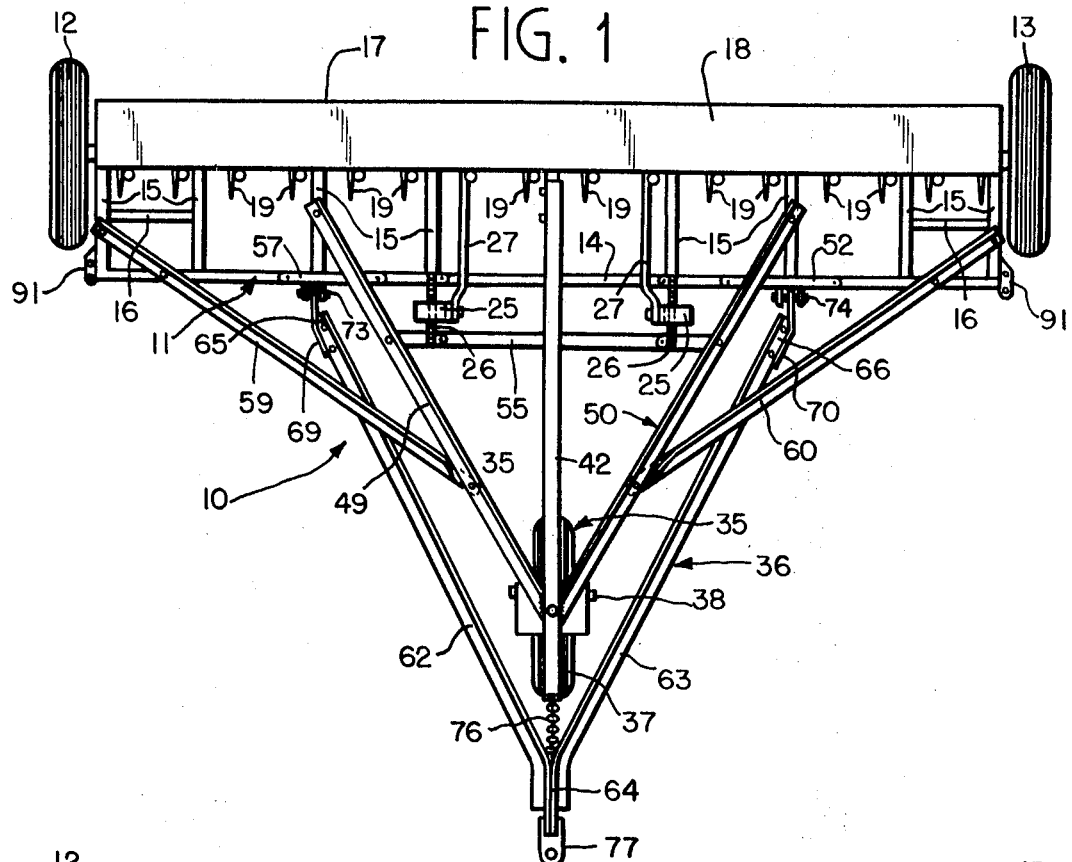
FIGS. 1 and 2 are plan views of agricultural implements in the form of seed drills.

While the hitch arrangements discussed herein may find use with a variety of agricultural implements, such as fertilizer spreaders, planters, plows and harrows, they are exemplified as specifically applied to drills for opening a plurality of parallel furrows and depositing a series of grass or grain seeds along each of those furrows. Thus, FIG. 1 depicts a drill unit 10 that includes a frame 11 disposed axially between and carried by a pair of spaced wheels 12 and 13. Frame 11 includes forward and rear (not shown) lateral stringers 14 typically of angle iron tied together into a rigid structure by spacers 15 and additional strengthening ties 16. Carried upon frame 11 is a seedbox 17 in which seed to be planted is stored, the box having a hinged cover 18 to permit filling the box.

Successively spaced between wheels 12 and 13 and suspended from frame 11 are a series of furrow-opening and seed-dispensing units 19. While the opening of the individual furrows may be accomplished by use of any desired device, such as double discs, moldboards, hoes or chisels, as here illustrated the openers are in the form of the familiar single discs 20 (FIG. 3) individually axled to respective carriages 21 each secured to one end of a bar 22 the other end of which is fastened, by a pivotal connection 23, to the front portion of frame 11 along stringer 14. This permits discs 20 to be swung from an elevated storage position downwardly into the soil being cultivated or vice versa. Such selective adjustment of each of two banks of the discs is afforded in this case by means of a respective pair of hand-operated levers 25 each manually disengageable from a locking sector 26 to effect movement of an arm 27 and a bellcrank 28, pivotally secured from a portion of frame 11, to raise or lower the spatial position of a pressure rod 29 and, in turn, raise or lower discs 20. The assemblage of rod 29 includes a compression spring 30 that presses against a ferrule 31 secured upon rod 29 which otherwise is arranged to float generally vertically relative to bellcrank 28; adjustment of the degree of pressure exerted by spring 30, in accordance with soil moisture conditions and other soil parameters, permits the obtainment of a uniform planting depth. Also a part of each unit 19 is a feed tube 32 that depends from box 17 with its lower end portion secured by carriage 21 in a position adjacent to disc 20 so as to dispense the seeds 33 into the furrow as it is opened by disc 20 as the unit moves in the forward direction indicated by arrow 33 in FIG. 3.

As thus far described, the seed drill is entirely conventional and the portions illustrated in connection with this description are typical and a regular, though in some cases simplified, part of a widely used, commercially available drill. For this reason and also in the interest of clarity of illustration, a number of additional details have been omitted from the drawings and this description. These details include such well-known mechanisms as adjustably gated force-feed systems that meter the supply of seeds from tubes 31 at a set rate, combinations of gears and chains that constitute the drive assembly deriving power from the rotation of the wheels in order to turn the shaft or shafts that operate the seed-dispensing mechanism, power-driven agitators located within seedbox 17, the inclusion of a press wheel mounted behind each disc so as more fully to close and compact the seed furrow and more sophisticated mechanisms, including those of a remotely controlled hydraulically actuated type, in addition to or in substitution for the simple illustrated systems that are operated by means of levers 25.

Returning now to detailed consideration of further features in implement 10, fixed rigidly from and ahead of frame 11 is a castor wheel assemblage 35 together with a separate pivotally affixed drawbar 36. Assemblage 35 includes a castor wheel 37, preferably interchangeable with wheels 12 and 13, journaled upon an axle 38 carried by a bifurcated dolly 39 from which projects upwardly a spindle 40. A journal 41 mounted in one end portion of a channel-iron member 42 receives spindle 40 which is secured in place by means of a nut 43 threaded upon the upper end of the spindle. A plurality of washers 44 encircle spindle 40 beneath journal 41 and are selected in number as desired to adjust the elevation of the front end of channel member 42 and, hence, achieve variation in the attitude of implement 10 relative to the underlying ground surface 45. Depending downwardly from the rear end portion of channel member 42 is an ear 46 that is bolted along its lower margin to the middle one of spacers 15. An additional lug 47 is bolted into position from the underside of channel member 42 to stringer 14.

Enhancing the rigidity of assemblage 35 are a pair of braces 49 and 50 formed of angle irons that are individually welded at one of their ends to respective opposite sides of channel member 42 with each projecting rearwardly and being bolted to respective ones of spacers 15 each located intermediate the center and opposing ends of frame 11. A rigid stub 51 is also welded in place been the underside of brace 50 near its rear end and a plate 52 that is bolted to stringer 14 at a location toward a respective end of frame 11 from its center. Additionally, a strap 53 depends downwardly from an intermediate portion of brace 50 where it is bolted to and thereby supports a crosspiece 55 upon which the assemblage of sectors 26 and levers 25 is mounted. Similarly, a stub 56 connects brace 49 to a plate 57 bolted to the other side of center on stringer 14 and a strap 58 also depending from brace 49 supports the other end of crosspiece 55. Adding additional rigidity and strength to the castor wheel assemblage are further braces 59 and 60 individually bolted at one end to intermediate portions respectively of braces 49 and 50 and at their opposite end portions being bolted near respective opposite front corners of frame 11.

Drawbar 36 is composed of a pair of angle irons 62 and 63 welded together at their common end regions 64 and bent angularly apart so as to dispose their opposite end regions 65 and 66 adjacent to the respective spaced portions of stringer 14 where plates 52 and 57 are secured. So that drawbar 36 is pivotally coupled vertically to frame 11, bifurcated hinges 67 and 68 project individually forward from each of respective plates 57 and 52; a corresponding pair of hinge connectors 69 and 70, to which end regions 65 and 66 individually are respectively bolted, include respective apertured ears 71 and 72 that are received within the related ones of hinge members 67 and 68 and secured by means of respective pins 73 and 74 that are disposed horizontally in order to permit the drawbar to be swung vertically.

An upwardly opening slot in a plate 75 affixed to the forward end of channel member 42 captivates a selected link in one end portion of a chain 76 the other end of which is bolted to region 64 of drawbar 36. In this manner, the drawbar is suspended from the castor wheel assemblage at whatever horizontal spatial position is desired. Completing the drawbar unit is an element 77, in this case in the form of a clevis, at its forward end that enables the drawbar to be attached to a source of towing power, such as a tractor, while permitting pivotal movement horizontally as between the tractor and the drawbar.

Figure 2:
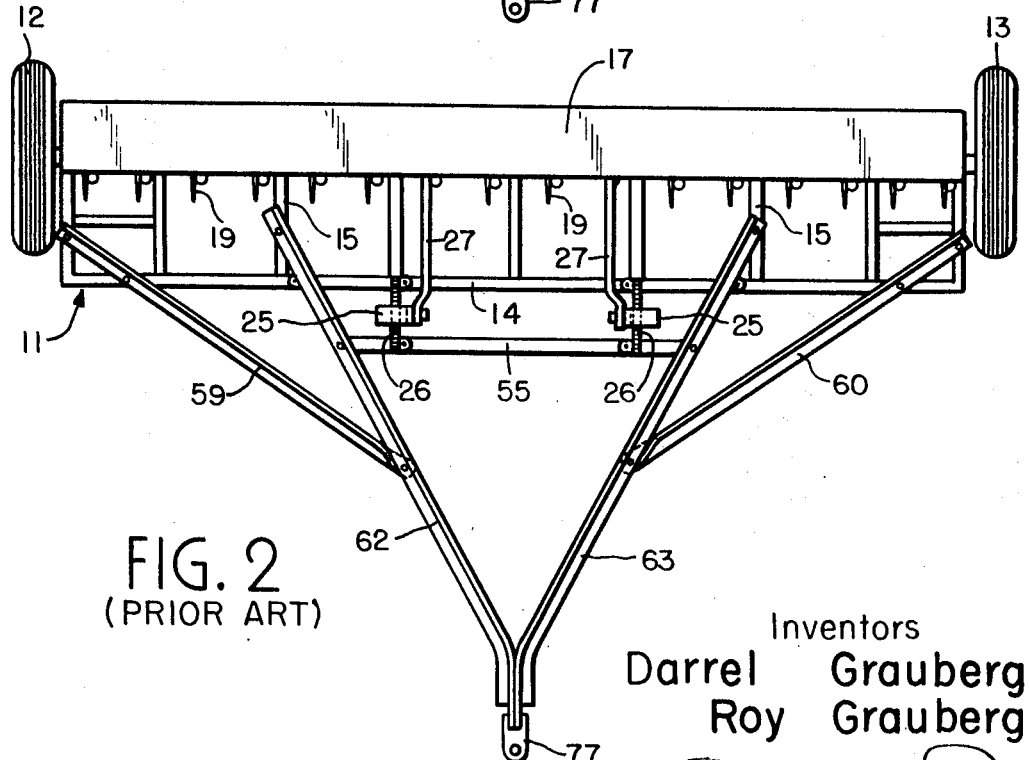

As described in connection with the present embodiment, most of the joinder of the different parts has been by means of bolts that are secured in place by corresponding nuts. This arises because of the implement of FIG. 1 as specifically detailed herein represents an actual field modification of a commercially available seed drill as represented in FIG. 2 of the drawing; the modifying components are formed to fit existing holes and surfaces of the original units. It will be understood that each of the fixed connections heretofore described may instead be obtained by other modes of connection such as welding and rivoting. Analogously, parts that are described as being separate may be integrally formed, such as in the alternative of forming hinge connectors 69 and 70 integrally upon the end regions of angle irons 62 and 63. As another example, the function of plates 52 and 57 may be performed directly by the adjacent portions of stringer 14. Further, different modifying parts may be needed for field conversion of other commercial units.

However, a direct comparison of the modified implement of FIG. 1 with the original implement of FIG. 2 serves to demonstrate both the ease and economy of obtaining the features in the modified version. That is, what were outer braces 59 and 60 of the drawbar structure in FIG. 2 become the outer braces of the castor wheel assemblage in FIG. 1. Drawbar 36 is constructed of the same angle iron and clevis combination in both versions, but in the modified implement of FIG. 1 it is relocated to a different, lower position, is hinged to swing vertically and is supported as to horizontal attitude by chain 76. At the same time, the previous location of the drawbar is now occupied by braces 49 and 50 that are structurally joined to frame 11, crosspiece 55 and outer braces 59 and 60 in substantially the same manner as the drawbar previously was joined. Thus maximum use is made of all original parts and connecting means. The principal additional components in FIG. 1 include the castor wheel assemblage, the hinge mechanism coupling the drawbar to the frame and the chain suspending the drawbar from the castor wheel assemblage.

When using the original implement of FIG. 2, and implements of the kind under discussion typically are very heavy, it has been a "back-breaking" task to hitch or unhitch the drawbar from a tractor without resorting to the inconvenient and time-consuming use of a jack. Such an undesirable feature is amplified when a plurality of such implements are combined together so as to be towed in common by a single tractor. This inefficiency and difficulty is avoided with the modified implement of FIG. 1. In that version, essentially the entire weight, tending to rock the front of the implement forwardly and downwardly, is borne by castor wheel 37. Consequently, it is only necessary for the operator to lift the comparatively light weight of drawbar 36 in order to couple or uncouple the implement from the tractor. At the same time, the orientation or attitude of the implement itself is selectively adjustable, in this case merely by choosing the number of washers 44 placed around spindle 40; in this way, the attitude of the implement may be entirely independent of the elevation of the tractor hitch. Also, selection of the length of chain 76 utilized constitutes a most simple and effective way of adjusting the elevation of clevis 77 in correspondence with the elevation of the mating hitch element affixed to the tractor. Once hitched, however, chain 76 preferably is secured with sufficient slack to allow ample freedom of vertical movement by drawbar 36 as uneven terrain is encountered. It is apparent that, whether incorporated as a part of original manufacture or the result of field modification as exemplified by changing the implement of FIG. 2 to that of FIG. 1, the latter version affords enhanced utility, ease and simplicity of employment in the field, time-saving and convenient facility of connection and disconnection and advantageous flexibility of implement attitude and hitch elevation.

The castor-wheel-supporting structure is located above drawbar 36 in a position occupied by the drawbar when originally affixed rigidly to the drill frame in the original unit before modification. Castor wheel 37 thus may be of large size and positioned well ahead of wheels 12 and 13. This minimizes pitch of the drill with unevenness of terrain and results in more uniform disposition. At the same time, it serves to reduce stresses developed in the implement frame and the hitch components as the entire system is towed over uneven ground.

As arranged in FIG. 6 specifically to enable the combined towing of two agricultural implements by means of a single tractor or other source of motive power, the system illustrated includes two implements 80 and 81 each of which in this case is identical to the implement described in connection with FIGS. 1, 3 and 4. Thus, each of implements 80 and 81 includes frame 11 carrying seedbox 17 and disposed between wheels 12 and 13, and a drawbar 36, pivoted from frame 11 to swing vertically, is suspended from a castor wheel assemblage 35.

In order to tow the dual units 80 and 81 from a single tractor or the like, the system of FIG. 6 includes an element 82, again in this case in the form of a clevis, that mates with a matching pin connector of conventional nature secured to the towing tractor. Coupled between element 82 and a portion of the frame 11 intermediate the wheels of implement 80 is a linkage which includes that drawbar 36 and a member 83. A first link 84 is coupled between element 82 and an end portion 85 in frame 11 adjacent to the wheel 13 of implement 80. Projecting laterally away from end portion 85 is a rigid strut 86, and another link 87 is coupled between element 82 and the remote or outboard end of strut 86. Finally, the drawbar 36 of implement 81 is coupled between that outer end of strut 86 and the intermediate portion of the frame 11 on implement 81.

Strut 86 need not be aligned parallel to the axis of the wheels 12 and 13 on implement 80. Instead, its angle of projection from implement 80 and, correspondingly, the length of link 87 are selected in view of the overall length, in a fore and aft direction, of the drawbar 36 on implement 81 so that the frame of the latter is disposed to the rear of the frame on implement 80 a distance sufficient to avoid physical interference between implements 80 and 81 as a turning movement in either direction is executed with the entire system. At the same time, the length of strut 86, or the distance it projects away from implement 80, is selected so that the near end portion 88 of implement 81 is substantially in alignment with end portion 85 of the more forward implement 80. In this way, the two implements together drill seed along a series of parallel paths, indicated by dashed lines 90, that are evenly spaced throughout the total width covered by both implements.

Strut 86 is attached to implement 80 in a manner that permits it to pivot vertically both above and below a horizontal plane. Such freedom of vertical movement accommodates changes in relative elevation of the ground surfaces beneath the two implements as, for example, when implement 81 drops somewhat into a depression while implement 80 rides across higher ground. That is, the outer end of strut 86 is free to follow all movements of the drawbar on the trailing implement. Additional flexibility of the system in this respect also is afforded by the pivotal coupling between drawbars 36 and frames 11.

While such pivotal connection of strut 86 may be achieved by securing it to the frame of implement 80 with any of a number of known mechanisms, a simple mechanism is illustrated in FIG. 5. In this case, a bifurcated channel 91 supports a vertically oriented pivot pin 92 that receives an opening 93 formed in the near end of strut 86. Simply by choosing the diameter of opening 93 to be somewhat larger than that of pin 92, so as to form a loose or "sloppy" fit between the two, the outer end of strut 86 is permitted to swing in a vertical direction. At the same time, the combination of pin 92 and opening 93 permits strut 86 also to be pivoted in the horizontal direction when uncoupled from link 87 and implement 81. This is advantageous when decoupling the different implements to permit individual or tandem towing; that is, strut 86 may then be swung around and simply tied or clipped to a convenient portion of the implement structure, such as link 84, so as to be out of the way and yet readily available for subsequent reuse.

While the implement end of link 84 could be connected by also securing it to pin 92, as shown in FIG. 5 it is connected by a separate pin 94 also carried by channel 91 and similarly received in an enlarged opening 95 formed in a flattened end portion of link 84. Once again, the illustrated type of loose connection affords vertical flexibility in the position of link 84, when it is constructed in rigid form, so as to permit easy adjustment of the elevation of hitch element 82 in conjunction with the available vertical movement of drawbars 36. At the same time, the "loose" connection permits link 84 to be swung in a horizontal direction, if desired, upon disconnection of the system. Somewhat similarly, a single loose-fitting vertical pivot pin also is employed at each end of member 83 and link 87. The forward ends of member 83 and link 87 are pinned between clevis like cross straps 96 welded or otherwise affixed laterally across link 84 immediately behind hitch element 82. The pin at the strut end of link 87 also serves in this instance to connect the clevis on the drawbar 36 of implement 81 and thus permit the latter drawbar to pivot in a horizontal direction. Disconnection of this common pin permits link 87 to be swung against link 84 for storage, when desired.

It will be observed that links 84 and 87 together with strut 86 define a triangle. Similarly, link 84 and member 83 together with the structure of implement 80 define another triangle the effective side of which formed by the implement structure is depicted by a dashed line 91a in FIG. 6. The two triangles have a common side 84. Similar combinations of geometrical triangles, with a pivot connector at each corner of the triangles, are known for ensuring that rear implement 81 is properly positioned relative to implement 80 during towing operation. In this case, however, each joint between the links, linkages and strut 86 is completed by a single loose-fitting pin-type pivot device such as a conventional bolt held in place by a nut or a pin secured by a snap fastener. This feature contributes directly to economy of fabrication and ease and quickness of assembly or disassembly of the system. At the same time, the loose pivot pin fits afford flexibility in the nature of vertically pivotal movements that relieve stresses arising from terrain irregularities. As also indicated in part, the freedom of horizontally pivotal movement of different ones of the components when the system is disconnected can mean, when desired, that all joints need not be completely disengaged; instead, different ones of the components may be left connected at one end and swung against another component for storage.

As shown in FIG. 6, each of member 83, links 84 and 87 and strut 86 are constructed from rigid metal stock and have had their ends flattened to accommodate the drilling of enlarged openings therein for subsequent joinder of those components in a pivot pin connection. In one alternative, member 83 and links 84 and 87 may be constructed of a flexible towing element such as stranded metal cable, in which case it is not necessary that the end connections permit horizontal and vertical flexibility. This is convenient for the purpose of storing these components when not in use. Moreover, it is preferred for ease of hitching the units together that link 87 be a flexible cable and that link 84 and member 83 be of a rigid nature. On the other hand, strut 86 must be so formed as to rigidly position its outer end, and hence the point of coupling for the drawbar 36 of implement 81, a fixed distance and direction away from implement 80 so that the following implement 81 is properly situated as discussed. In another alternative, link 83 may actually or effectively be capable of telescoping to a shorter length for use, when the implements are coupled in cascade, to move the tractor more centrally in front of the lead implement. In that case, link 87 is freed at one end and link 84 simply swings somewhat to a new position.

In order to sweep an even wider path as the result of a single tractor movement, the system illustrated in FIG. 7 adds to the combination a third implement 97 in addition to implements 80 and 81. As before, implement 97 is also of the kind described in more detail with respect to FIG. 1 and includes a castor wheel assemblage 35 and a drawbar 36. The combination of links, linkages and struts is similar to that described in connection with FIG. 6. However, in this case the primary hitch element 98 for horizontally pivotal attachment to the tractor is located directly ahead of implement 80, and additional connecting components are included to the other side of implement 80 so as to combine the third implement 97. Thus, a pair of triangularly shaped plates 99 form a plural-pin clevis that is secured to the forward end of a member 100 immediately behind hitch element 98 which once more is a clevis. The other end of member 100 is coupled by a pin to the clevis at the front of the drawbar 36 on implement 80. A strut 101 projects laterally from implement 80 toward implement 81 in the same manner as strut 86 in FIG. 6; in this case, strut 101 is angled slightly forward of the corresponding element of FIG. 6 to illustrate a condition where the trailing implement may be moved closer to the leading implement 80 as in the case where less sharp turns are to be encountered.

Also analogously to the FIG. 6 system, strut 101 is secured at both ends by vertical pivot pins and a link 102 is connected by vertical pivot pins between plate 99 and channel 91. An outer link 103 is likewise connected by vertical pivot pins between plate 99 and the outer end of strut 101 to which drawbar 36 of implement 81 also is pinned. Similarly in a mirror image manner, implement 97 is towed in a fixed position relative to implement 80 by means of links 104 and 105 together with a laterally projecting strut 106. Again, all of the various rigid components preferably are connected by loose-fitting vertical pivot pins which may simply be bolts secured by nuts. It may also be noted in passing that pin holding channels 91 are shown in both FIGS. 6 and 7 as being mounted upon the forward frame corners of each of the implements so that any one implement may readily be used without change at any of the different positions in the overall combinations.

As in FIG. 6, each of the different end connections of the rigid components utilized in the towing system of FIG. 7 preferably are completed by a simple pin so as to permit individual flexibility of horizontal and vertical movement, while at the same time the overall structure when assembled rigidly fixes the spacings of the trailing units relative to the forward unit. In particular, the connections of struts 101 and 106 to the frame of implement 80 are such as to permit those struts to swing vertically at their outer ends both above and below the normal horizontal plane; at the same time, the connections permit these struts to be swung horizontally when freed at their outer ends. Like in FIG. 6, the pulling components in the FIG. 7 system, as contrasted with struts 101 and 106, may alternatively be rigid or flexible in individual nature. Like in the case of FIG. 6, however, it is preferred that links 103 and 105 be flexible cables and that member 100 and links 102 and 104 be of a rigid nature.

In use of the systems in FIGS. 6 and 7, the different implements individually follow differences in the terrain over which each is pulled, the system having sufficient flexibility of all essential pivot points in the vertical direction both above and below the horizontal to permit individual changes in elevation and avoid the development of stresses in different parts of the system. At the same time, however, the networks formed by the struts and the spokelike components fanning apart from the forward hitch coupler maintain the different implements fixed in relative horizontal spatial positions. The trailing elements are properly aligned so as to maintain a continuous and even spacing of the different seeded paths, while the arrangement is also such as to prohibit interference between the different elements during turning concerning movements in either direction.

Yet, the different components which make up the plural-hitch towing systems individually are each of sufficiently light weight as to be easily handled and assembled and/or disassembled by a person working alone. Correspondingly, the different connecting modes of the system components together with the pivotal connections of the drawbars to the implement frames enable the lone worker to connect or disconnect the entire system without the necessity of lifting excessively heavy weight or having to resort to the use of jacks or other time-consuming and inconvenient devices. The use of simple pin connectors such as standard bolts renders the entire system capable of being put together or taken apart in a minimum of time and the same features, together with the capability of forming all of the other components from ordinary stock materials, render the entire arrangement economical of manufacture. Horizontal pivotal flexibility at least effectively at each pivot point permits ready storage of different components when towing the implements in cascade and saves time in that, when changing from one towing arrangement to another, it is unnecessary to connect or disconnect all of the pivotal connections. This flexibility also aids in reducing stresses.

Separation of the functions of the vertically swingable drawbars from the adjustably fixed castor wheel assemblages enables the implements individually to assume the attitude dictated by the ground surface beneath them and avoids stress development by reason of uneven ground surface. When towing two units in cascade, for example, along a road having a high crown, no part of the trailing unit carries any weight of the forward unit as would be the case, in contrast, were the forward unit hitched to the castor wheel assemblage of the rear unit. There is thus no need to remove any castor wheels when converting to the cascade arrangement for road transport.

As mentioned earlier, seed drills typically include a series of press wheels that individually follow the respective drills and close the furrows. Also conventional is the inclusion of a walkboard located above the press wheels to facilitate filling the seedbox. It will be observed that the hitch arrangements discussed in no way interfere with either the press wheels or the walkboard.

It is, however, advantageous to raise the press wheels above the ground surface when transporting the implements over a roadway. To this end, one or more cable winches 110 may be disposed on the rear wall of seedbox 17 as shown in FIG. 3 (but deleted from the other figures for convenience). This need only be a conventional boat trailer winch having a handle, for manual operation, coupled to a cable drum through suitable gears and including a locking mechanism. A hook on the end of the cable is engaged with the press wheel assembly in order to raise it. For the frequent case where the implement has two separate press wheel assemblies located side by side, two such winches preferably are employed, one centered with respect to each unit. Noting again that each of the implements is of heavy weight, the winches also may be used advantageously to pull one implement into towing position behind another, a maneuver that can be difficult to perform with the tractor because of space limitations.

In all embodiments, struts 86, 101 and 106 have been shown and described as projecting from a front corner of the leading implement. It can be advantageous instead to connect the struts to a rear corner. Upon changing to a cascade hookup for road transport, the outer link (e.g. link 87 in FIG. 6) in that case is disconnected from the strut and, simply by pulling the forward implement ahead with the tractor, the trailing implement is caused by the strut to swing behind the other so as at least to be near its hookup position.

While particular embodiments of the invention have been shown and described, it will be obvious to those skilled in the art that changes and modifications may be made without de-

We claim:

1. In an implement system including at least two towed units each of which has a frame disposed axially horizontally between a pair of wheels and which carries an agricultural assembly, a plural hitch comprising:
   an element for horizontally pivotal attachment to a source of pulling power;
   a first linkage coupled between said element and a portion of one of said frames intermediate its wheels;
   a first link, pivotally coupled horizontally and vertically at each of its ends, coupled between said element and one end portion of said one frame adjacent to one of its wheels;
   a rigid strut pivotal vertically, above and below a horizontal plane, and projecting laterally away from said one end portion a selected distance;
   a second link pivotally coupled horizontally and vertically at each of its ends, coupled between said element and the end of said strut remote from said one end portion;
   and a second linkage having its one end coupled to said remote strut end and its other end pivotally coupled, to swing vertically, to a portion of the other of said frames intermediate its wheels, said second linkage being of a length to dispose said other frame to the rear of said one frame and said distance being of a length to dispose the end of one of said assemblies substantially in alignment with and ahead of the opposite end of the other of said assemblies.

2. In an implement system including at least two towed units each of which has a frame disposed axially horizontal between a pair of wheels and which carries an agricultural assembly, a plural hitch comprising:
   an element for horizontally pivotal attachment to a source of pulling power;
   a system as defined in claim 4 in which said a first linkage, including a member pivotally coupled horizontally and vertically at each of its ends, coupled between said element and a portion of one of said frames intermediate its wheels;
   a first link coupled between said element and one end portion of said one frame adjacent to one of its wheels;
   a rigid strut pivotal vertically, above and below a horizontal plane, and projecting laterally away from said one end portion a selected distance;
   a second link pivotally coupled horizontally and vertically at each of its ends, coupled between said element and the end of said strut remote from said one end portion;
   and a second linkage having its one end coupled to said remote strut end and its other end pivotally coupled, to swing vertically, to a portion of the other of said frames intermediate its wheels, said second linkage being of a length to dispose said other frame to the rear of said one frame and said distance being of a length to dispose the end of one of said assemblies substantially in alignment with and ahead of the opposite end of the other of said assemblies.

3. In an implement system including at least two towed units each of which has a frame disposed axially horizontal between a pair of wheels and which carries an agricultural assembly, a plural hitch comprising:
   an element for horizontally pivotal attachment to a source of pulling power;
   a first linkage coupled between said element and a portion of one of said frames intermediate its wheels with said first linkage being pivotally coupled, to swing vertically, to said one frame;
   a first link coupled between said element and one end portion of said one frame adjacent to one of its wheels;
   a rigid strut pivotal vertically, above and below a horizontal plane, and projecting laterally away from said one end portion a selected distance;
   a second link coupled between said element and the end of said strut remote from said one end portion;
   and a second linkage having its one end coupled to said remote strut end and its other end pivotally coupled, to swing vertically, to a portion of the other of said frames intermediate its wheels, said second linkage being of a length to dispose said other frame to the rear of said one frame and said distance being of a length to dispose the end of one of said assemblies substantially in alignment with and ahead of the opposite end of the other of said assembles.

4. A system as defined in claim 3 in which said linkages each include a V-shape drawbar individually coupled to respective pairs of spaced portions of the corresponding ones of said frames.

5. A system as defined in claim 1 in which each of said units includes a castor wheel assemblage rigidly fixed from and ahead of its frame.

6. In an implement system including at least two towed units each of which has a frame disposed axially horizontal between a pair of wheels and which carries an agricultural assembly, a plural hitch comprising:
   an element for horizontally pivotal attachment to a source of pulling power;
   a first linkage coupled between said element and a portion of one of said frames intermediate its wheels being pivotally coupled vertically to said one frame;
   a first link coupled between said element and one end portion of said one frame adjacent to one of its wheels;
   a rigid strut pivotal vertically above and below a horizontal plane, and projecting laterally away from said one end portion a selected distance;
   a second link coupled between said element and the end of said strut remote from said one end portion;
   a castor wheel assemblage for each of said units and fixed rigidly from and ahead of the frame of the respective unit;
   and a second linkage having its one end coupled to said remote strut end and its other end pivotally coupled, to swing vertically, to a portion of the other of said frames intermediate its wheels, said second linkage being of a length to dispose said other frame to the rear of said one frame and said distance being of a length to dispose the end of one of said assemblies substantially in alignment with and ahead of the opposite end of the other of said assemblies.

7. A system as defined in claim 6 which further includes means coupled between said linkages and assemblages for suspending each of said linkages in adjustable fixed spatial relationship with respect to the corresponding ones of said assemblages.

8. In an implement system including at least two towed units each of which has a frame disposed axially horizontal between a pair of wheels and which carries an agricultural assembly, a plural hitch comprising:
   an element for horizontally pivotal attachment to a source of pulling power;
   a first linkage coupled between said element and a portion of one of said frames intermediate its wheels;
   a first link coupled between said element and one end portion of said one frame adjacent to one of its wheels;
   a rigid strut pivotal vertically, above and below a horizontal plane, and projecting laterally away from said one end portion a selected distance;
   a second link coupled between said element and the end of said strut remote from said one end portion;
   a second linkage having its one end coupled to said remote strut end and its other end pivotally coupled, to swing vertically, to a portion of the other of said frames intermediate its wheels, said second linkage being of a length to dispose said other frame to the rear of said one frame and said distance being of a length to dispose the end of one of said assemblies substantially in alignment with and ahead of the opposite end of the other of said assemblies; and a third towed unit as defined for the first two together with another strut vertically pivoting and projecting laterally away from the other end portion of said one frame said selected distance, a third link coupled between said element and the end of said other strut remote from said other end portion and a third linkage coupled between said remote other strut end and a portion of the frame of said third unit intermediate its ends with said third linkage being of a length to dispose said third unit frame to the rear of said one frame.

9. In an implement system including at least two towed units each of which has a frame disposed axially horizontally between a pair of wheels and which carries an agricultural assembly, a plural hitch comprising:

an element for horizontally pivotal attachment to a source of pulling power; a first linkage coupled between said element and a portion of one of said frames intermediate its wheels;

a first link coupled between said element and one end portion of said frame adjacent to one of its wheels;

a rigid strut pivotal vertically, above and below a horizontal plane, and projecting laterally away from said one end portion a selected distance;

a second link coupled between said element and the end of said strut remote from said one end portion;

means defining a loose-fitting vertical and located at the adjacent ends of at least said strut and said second link for detachably connection said strut and said second link into said system;

and a second linkage having its one end coupled to said remote strut end and its other end pivotally coupled, to swing vertically, to a portion of the other of said frames intermediate its wheels, said second linkage being of a length to dispose said other frame to the rear of said one frame and said distance being of a length to dispose the end of one of said assemblies substantially in alignment and ahead of the opposite end of the other of said assemblies.

10. In an implement system including at least two towed units each of which has a frame disposed axially horizontal between a pair of wheels and which carries and agricultural assembly, a plural hitch comprising:

an element for horizontally pivotal attachment to a source of pulling power:

a first linkage coupled between said element and a portion of one of said frames intermediate its wheels;

a first link coupled between said element and one end portion of said one frame adjacent to one of its wheels, said first linkage, a part of said frame and said first link together defining a structure including three corners with means defining a loose-fitting vertical pivot pin being located at each corner of said structure for detachably interconnecting its sides;

a rigid strut vertically pivoting and projecting laterally away from said one end portion a selected distance;

a second link coupled between said element and the end of said strut remote from said one end portion, said first link, strut and second link together defining a triangle with means defining a loose-fitting vertical pivot pin located at each of the corners of said triangle for detachable interconnecting the respective sides thereof;

and a second linkage having its one end coupled to said remote strut end and its other end pivotally coupled vertically to a portion of the other of said frames intermediate its wheels, said second linkage being of a length to dispose said other frame to the rear of said one frame and said distance being of a length to dispose the end of one of said assemblies substantially in alignment with and ahead of the opposite end of the other of said assemblies.